United States Patent [19]

Brown, Jr.

[11] 3,826,574
[45] July 30, 1974

[54] NEPHELOMETER
[75] Inventor: Fon R. Brown, Jr., Hyrum, Utah
[73] Assignee: Continental Distributors, Inc., Los Vegas, Nev.
[22] Filed: Feb. 12, 1973
[21] Appl. No.: 332,014

[52] U.S. Cl.................. 356/103, 356/236, 250/226
[51] Int. Cl. ......................................... G01n 21/00
[58] Field of Search ............ 315/291; 356/102, 103, 356/104, 35–42, 180, 236, 244; 250/226

[56] References Cited
UNITED STATES PATENTS
| | | | |
|---|---|---|---|
| 2,407,113 | 9/1946 | Tuck | 315/291 |
| 2,436,262 | 2/1948 | Miller | 356/104 |
| 3,450,501 | 6/1969 | Oberhardt | 356/103 |

OTHER PUBLICATIONS

"Ruby Improvement For Lasers – Task II;" First Quarterly Report; U.S. Army Signal Research and Development Laboratories, pp. 10, 11.

Primary Examiner—Ronald L. Wibert
Assistant Examiner—Conrad Clark
Attorney, Agent, or Firm—Philip A. Mallinckrodt

[57] ABSTRACT

A nephelometer or the like is constructed with a light-integrating chamber opening into a sample-receiving test chamber, so light from a beam of light directed longitudinally through a test tube holding a sample of liquid to be tested, which light is transversely scattered by particles of matter within the liquid, will be received by such light-integrating chamber. Means for reflecting and diffusing the received light is provided within the light-integrating chamber, so the received light will, in effect, be conserved and stored for transmittal of a maximum amount thereof to light-detecting means. As preferably constructed, the light-integrating chamber is annular and concentrically surrounds and opens into the test chamber, the light reflecting and diffusing means being a circumferential, unpolished but reflective, machined wall surface backing the annular chamber and confronting the test chamber, and the light detecting means being one or more sensors exposed to light from the light-integrating chamber through one or more ports provided in the diffusely reflective wall surface. In this way, signals of normal intensity are obtained by a light beam of less intensity than normal, thereby reducing heat and resulting turbulence of the sample, and the light received by the detectors is more representative of conditions in the sample than is normally the case. Electronic circuitry is employed that gives linear current output proportional to the amount of light detected. Thus, direct read-out of light measurements are possible.

12 Claims, 5 Drawing Figures

PATENTED JUL 30 1974  3,826,574

NEPHELOMETER

BACKGROUND OF THE INVENTION

1. Field

The invention is in the field of photometric instruments for measuring the amount of light scattered by extraneous particles in a test sample of fluid through which a beam of light is passed, especially so-called nephelometers as widely used for determining triglycerides in blood serum.

2. State of the Art

In nephelometers as presently constructed, light detectors are located in respective ports directly abutting a test chamber arranged to receive a sample of test liquid contained in a standard glass test tube. A light beam passed longitudinally through the tube is intercepted and transversely scattered by particulate matter in the liquid, that portion of the scattered light which is normal, i.e., 90°, to the longitudinal axis of the light beam being picked up by the detectors. Necessarily, the light detected by the detectors is the amount which is directly scattered into the ports, and thus, is only a small portion of the light that is actually intercepted and scattered. Because of the small proportion of the scattered light that reaches the detectors in any given instance, it is necessary to have a very bright light beam to insure that a representative amount of light reaches the detectors. A very bright light beam requires a very bright source of light, which creates an undesirable amount of heat. This, in turn, results in the heating of the test sample, which causes convection currents to form within the liquid. Accuracy of the measurements taken is affected significantly. If, as is true in many instances, the sample container has blemishes on its surface and if one of these blemishes is directly in front of the port, accuracy of the measurements is adversely affected. Moreover, electronic circuitry presently used in connection with the detectors provides non-linear indications of the amount of light picked up by the detectors, requiring the operator to convert the instrument readings by use of various graphs or charts before the measurement results are useful.

SUMMARY OF THE INVENTION

Accordingly to the invention, a nephelometer or similar photometric instrument constructed along conventional lines is provided with a light-integrating chamber in communication with the sample test chamber. This is preferably in the form of an annular recess in the wall defining the usual test chamber, such recess opening circumferentially into the test chamber and being backed by a circumferential light-diffusing, reflective wall surface confronting the test chamber and causing the recess to act as a collecting area for light scattered by particulate matter in a sample placed within such test chamber. Light-detecting means are located to receive light from the light-integrating chamber, preferably being within a port or ports provided in the reflective wall of the recess so as to ultimately receive and measure most of the light going into such recess from the test chamber. It is desirable for the test chamber to be vertically elongate, so as to receive the usual sample-containing test tube, and for the light to be directed upwardly through the bottom of the tube. Electronic circuitry of proper design is connected to the light detecting means and to an indicating means, so as to provide a direct indication of the amount of light scattered by the sample or of properties of the sample directly related to the light scattered.

DRAWINGS

The best mode presently contemplated of carrying out the invention is illustrated in the attached drawing, in which:

FIG. 1 is a perspective view of a nephelometer constructed in accordance with the invention;

FIG. 2, a fragmentary vertical section taken on the line 2—2 of FIG. 1 to show the test chamber, the sample-containing test tube received thereby, and the light-integrating chamber opening into the test chamber;

FIG. 3, a horizontal section taken on the line 3—3 of FIG. 2;

FIG. 4, an axial vertical section taken on the line 4—4 of FIG. 3; and

FIG. 5, a block diagram of the elctronic circuitry.

DETAILED DESCRIPTION OF THE ILLUSTRATED EMBODIMENT

Figure 1:
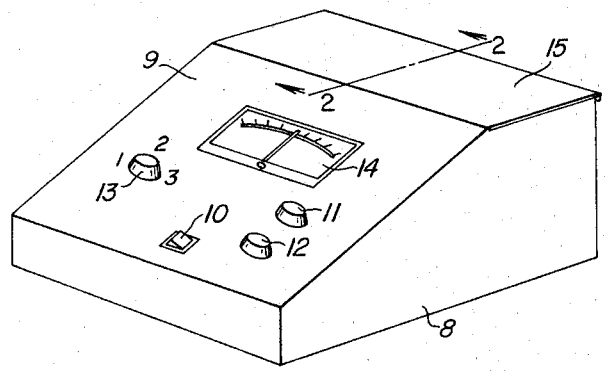

In the form here illustrated, the photometric instrument of the invention is a nephelometer comprising a protective housing 8 provided with a control panel 9 for components within the housing. A switch button 10 on the control panel enables electrical power to be turned on and off, and knobs 11, 12, and 13 control various parts of the electrical circuitry. A meter 14 provides measurement readout, and a cover 15 at the top of the housing opens to allow access to the interior.

Figure 2:
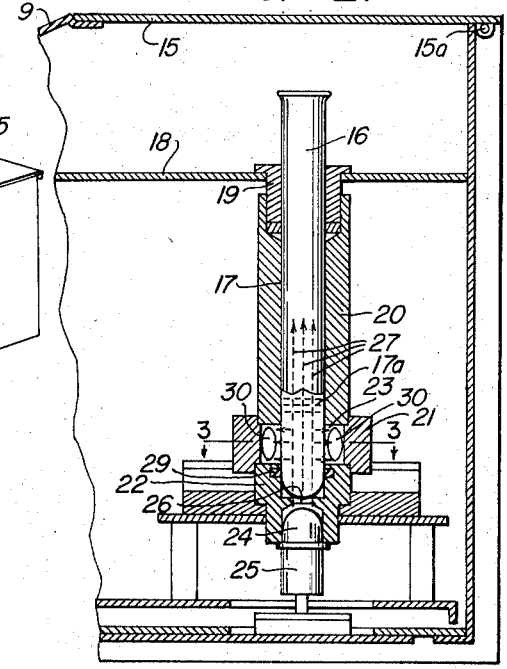

FIG. 2 shows cover 15 hinged at 15a so it can be swung back to allow a usual transparent glass test tube 16 to be inserted in a test chamber 17 that opens through horizontal partition wall 18 of the housing. Structural wall members 19, 20, 21, and 22 define test chamber 17, which is preferably cylindrical, and an annular recess 23 surrounding such test chamber and opening thereto as a light-integrating chamber.

Figure 3:
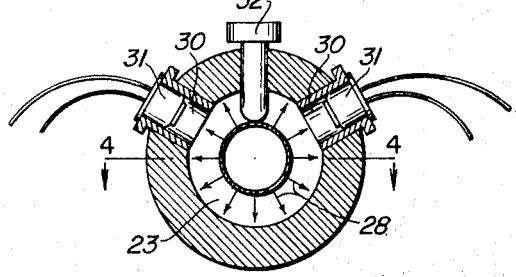

A light bulb 24 inserted in electrical outlet socket 25 projects a beam of light through a hole 26 in the otherwise closed bottom of member 22 and upwardly into and longitudinally through test chamber 17. When the sample-containing test tube 16 is in place in chamber 17, the light beam, here represented by the arrows 27, passes through the liquid test sample 17a contained by the test tube and, if there are particulate solids of appropriate type in such liquid, is scattered transversely at substantially 90° to the longitudinal axis of the beam as shown by the arrows 28, FIG. 3.

Figure 4:
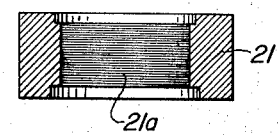

Wall members 19, 20, and 22 are preferably formed from a plastic material, such as polyethylene, but wall member 21 is advantageously formed from aluminum rod stock machined to shape so as to provide light-integrating chamber 23 with light reflecting and diffusing means in the form of wall surface 21a, see particularly FIG. 4.

An "O" ring 29 in member 22 prevents any light from escaping into test chamber 17 around the outside of the inserted test tube. Cover 15 is closed after the test sample has been placed in the test chamber, so that no outside light can enter the test chamber.

To make annular recess 23 light-integrating, the inside circumferential wall surface 21a of structural wall member 21, that backs such recess 23 and confronts test chamber 17, is provided with a light-diffusing, reflective finish. When such structural wall member 21 is machined to shape from aluminum as previously indicated, a functionally appropriate finish for surface 21a is provided by the machining itself which results in a series of closely spaced, minute furrows extending circumferentially about such surface. The machined surface is left unpolished, but is reflective nonetheless. In the present instance, see FIGS. 2 and 3, two ports 30 are located in wall member 21 to receive light trapped in light-integrating recess or chamber 23, and photo detectors 31 are positioned within the ports, respectively.

In use of the instrument, a test tube containing a test sample, here tube 16 containing sample 17a, is inserted into test chamber 17. Light bulb 24 projects a beam of light 27 longitudinally through such test tube and through the contained liquid sample. Particulate matter within the sample will intercept and transversely scatter some of the light 28 from the source beam 27 into the light-integrating chamber 23. Some of this light will directly enter ports 30 and impinge on detectors 31, but most of such light will strike wall surface 21a and will be diffusely reflected. The reflected light will bounce back and forth within chamber 23, being only moderately reduced in intensity because of the fact that surface 21a is primarily reflective rather than absorptive and will ultimately reach ports 30 and impinge upon detectors 31. Because the light is reflected and diffused each time it strikes wall surface 21a, chamber 23 serves to integrate the light and to distribute it essentially uniformly. Moreover, as previously indicated, since the light is continually reflected until it eventually reaches the detectors, the amount of light detected is essentially the total amount of light originally reflected into chamber 23.

It will be seen that the presence of this light-integrating chamber produces advantages over prior instruments in which the ports leading to the light detectors abut directly against the container holding the test sample. Since essentially all the light scattered by particulate matter in the area comprehended by the light-integrating chamber reaches the detectors, as contrasted with only the relatively small amount of light reflected directly into the detectors of prior instruments of this type, a much less intense source light may be used in instruments conforming to the invention. This eliminates heating of the sample and problems caused by such heating. Also, in prior instruments, blemishes in the test sample container cause inaccurate readings. Large variations in measurement readings are obtained by rotating the sample container in the test chamber, as is normally done in the use of nephelometers to arrive at a minimum or maximum reading, whichever is called for by operating instructions. In instruments conforming to this invention, such variations are reduced by a factor of 10.

It is desirable in the routine use of instruments of this type to leave the instrument turned on between uses, or, if the instrument has been turned off, to allow a long warm-up time before use. This is because the source light must be stable to get an accurate measurement of scatter light. The electrical circuitry of the present instrument is designed to enable the instrument to remain turned on for long periods of time, without unduly shortening the life of the source light. To obtain the required stability of such source light and at the same time to prolong its life, the electrical circuitry is arranged to bias such source light at a low level when the instrument is not in use. This keeps the filament near operational temperature, but does not tend to burn it out as does normal operation. An electrical switch 32 of double-pole, push button type, normally resiliently biased to "off" position, is so placed in test chamber 17 as to be actuated to "on" position when a test tube is inserted into such test chamber. This automatically energizes light bulb 24 to its full operational brilliance. Such bulb stabilizes almost immediately, because it has been kept on at the low level of operation. Moreover, its life is greatly extended over what is true in prior instruments.

It is preferred that silicon photo diodes be used as the light detectors 31, but any light sensitive detectors with appropriate circuitry may be used. The advantage of the silicon photo diodes is that their output is directly and linearly proportional to the light detected. Most other types of light detectors, such as the photosensitive detectors used in the prior instruments, are non-linearly porportional to light detected and thus require that the results be corrected for this non-linearity before they provide useful information.

Figure 5:
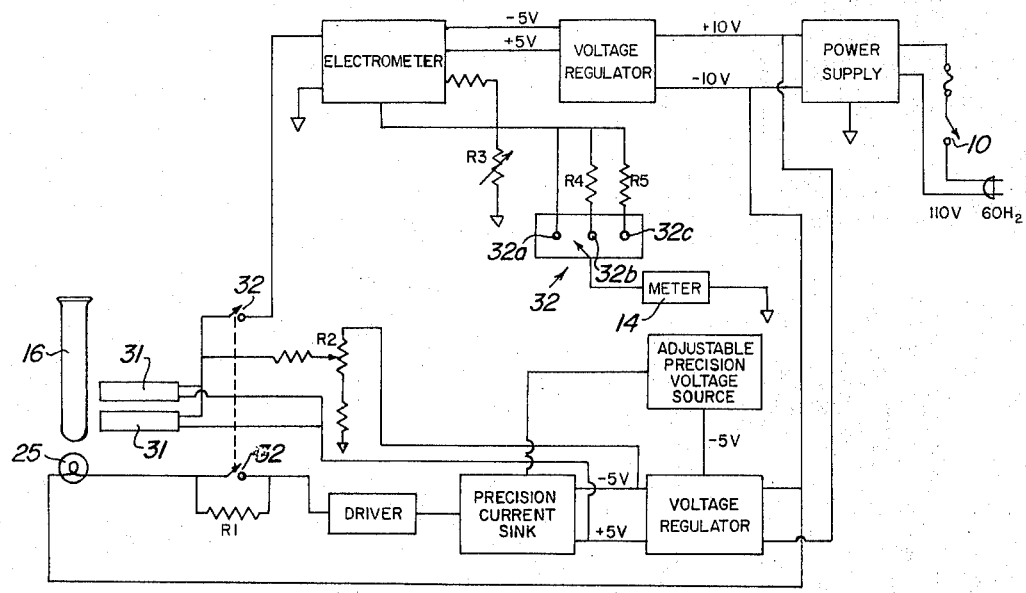

Preferred electrical circuitry utilizing silicon photo diodes is shown as a block diagram in FIG. 5. Electrical power from a 110 volt A.C. line enters the power supply, where it is converted to 10 volts D.C. with positive and negative outputs as indicated. This reduced voltage D.C. power is further reduced and accurately regulated to + and − 5 volts by two voltage regulators, one of which feeds into a precision current sink. An adjustable precision voltage source is also supplied with power from the same voltage regulator, and also feeds into the precision current sink. Variable voltage from the adjustable precision voltage source determines the amount of current passing through the precision current sink, which supplies a constant pre-set current to a driver that provides sufficient current gain to energize the light bulbs. Such driver supplies a constant current to outlet socket 25 for light bulb 24. A constant current is necessary to maintain the light at a constant and stable level.

When a test tube is in test chamber 17, maintaining switch 32 in its "on" position to provide a direct path between the driver and outlet socket 25, light bulb 24 is fully energized to its normal operational level. A resistor R1, series connected between the driver and outlet socket 25, reduces the power flowing to socket 25 when no test tube is in the test chamber and no test is being performed. This maintains a continuous flow of power to socket 25, but at a lower than normal level adapted to keep light bulb 24 energized but at a reduced level of operation that keeps such bulb ready for stable operation, without the usual warm-up period, yet significantly extending its normal operative life.

The voltage regulator supplying the driver with power also supplies power to detectors 31, which, as previously noted are a pair of silicon photo diodes. These diodes allow passage of currents that are proportional in value to the amounts of light which strike such diodes. The proportionality is linear. A variable resistor R2 is provided in an auxiliary power supply circuit for the detectors to supply offsets for the currents which flow in the diodes when no light is detected by them, as well as offsets for currents that may be caused by the insertion in the test chamber of a test tube containing a sample for calibration purposes. In this case, the test sample is distilled water furnishing a zero standard for a zero meter reading. Resistor R2 is adjusted by knob 11 on control panel 9 until the desired zero reading is obtained.

The second pole of electrical switch 32 connects detectors 31 to an electrometer, which converts current received from the detectors into directly proportional voltage readable on meter 14. Power for the electrometer is supplied by the other voltage regulator. A variable resistor R3, controlled by knob 12 on control panel 9, is provided to adjust the gain of the electrometer. Thus, if a calibrated standard test sample is in a test tube inserted in test chamber 17, R3 will be adjusted until meter 14 reads the proper value.

A range switch 32, having three positions, is connected between the electrometer and meter 14 and is operated by knob 13 on control panel 9. In position 32a in FIG. 5, the meter is connected directly to the output voltage of the electrometer. In position 32b, the connection is through a resistor R4 that reduces the voltage across the meter to one-half the electrometer output. In position 32b, the connection is through a resistor R5 that reduces the voltage across the meter to one-quarter the electrometer output. These resistor values are merely exemplary. Any desired range can be supplied.

It should be noted that the provision of sealing means to prevent light from escaping around the outside of the test tube, here the "O" ring 29, contributes significantly to the linearity of read-out, as does also the confining of the diffusely reflective surface means, here 21a, to a location where it will directly receive light from the test chamber that radiates at approximately a 90° angle to the longitudinal axis of the beam.

Because of the linearity of the read-out measurements, it is feasible in many instances to use a test sample undiluted or diluted in any ratio within the sensitivity range of the instrument, e.g. up to 1 part in 400 parts of the diluent, instead of the usual 1 part in 10.

It should be realized that light reflecting and diffusing surface 21a may be provided in various ways, although the unpolished machined surface previously described is advantageous since it results incidentally from the machining operation used to fabricate structural wall member 21. Most any unpolished, inherently reflective surface that does not produce a spectral type of reflection will be satisfactory, since it is desired that received light be trapped within and integrated by the chamber.

Although the instrument of the invention was developed primarily for use in the field of laboratory medicine, it can be used for other purposes, such as the measurement of air and water pollution caused by particulate matter in approximately the size range of 0.05 to 1.0 micron or by the hydrocarbon content of the exhaust from internal combustion engine, for example. For the latter determinations, a known volume of the exhaust gas is bubbled through a known volume of solution containing a deteregent for the hydrocarbon, e.g. lye, in order to provide a test sample.

Whereas this invention is illustrated and described with specific reference to the best mode presently contemplated of putting it into practice, various other embodiments are possible within the inventive concepts here disclosed and claimed.

I claim:

1. A nephelometer, comprising means defining a chamber for receiving a test sample; a source of light arranged to direct a light beam through a test sample in the test chamber; means defining an annular light-integrating chamber concentrically surrounding and circumferentially opening into said test chamber so as to receive light reflected transversely of the beam by the test sample; light-detecting means arranged to receive light from the light-integrating chamber and to provide electrical signals representative of the light detected; means within the light-integrating chamber for reflecting and diffusing light received by such chamber from the test chamber, thereby conserving and storing for ultimate transmittal to the light-detecting means that portion of said received light which is not immediately transmitted to the light-detecting means; electrical circuitry for converting electrical signals from the light-detecting means to electrical read-out signals; and read-out means arranged to be energized by said read-out signals.

2. A nephelometer according to claim 1, wherein the test chamber is cylindrical for receiving a sample-containing test tube.

3. A nephelometer according to claim 2, wherein the means for reflecting and diffusing light received by the light integrating chamber is a circumferential wall surface backing said chamber and confronting the test chamber, said surface being diffusely reflective.

4. A nephelometer according to claim 3, wherein the wall surface is an unpolished machined surface of inherently reflective material.

5. A nephelometer according to claim 4 wherein the light integrating chamber and wall surface thereof are provided by a structural wall member machined to provide an annular recess opening into a central core passage which provides part of the test chamber.

6. A nephelometer according to claim 1, wherein the means for reflecting and diffusing light received by the light integrating chamber comprises at least one light diffusing reflective surface.

7. A nephelometer according to claim 1, wherein light-sealing means is provided in the test chamber between the source of the light beam and the light integrating chamber to prevent light from passing around the outside of a test sample inserted in the test chamber.

8. A nephelometer according to claim 7, wherein the test chamber is configurated to snugly receive a samplecontaining test tube; and wherein the sealing means is an "O" ring mounted in the means defining the test chamber so as to closely hug the test tube.

9. A nephelometer according to claim 7, wherein the light-detecting means is provided by one of more silicon photo diodes.

10. A nephelometer according to claim 9, wherein the source of light is electrically powered and the electrical circuitry includes means for limiting below normal the amount of power supplied to the source of light, and means for switching to normal power.

11. A nephelometer according to claim 10, wherein the switching means comprises a switch having actuating means therefor disposed in the test chamber, and means normally resiliently biasing said switch to open position, said switch being arranged for actuation to closed position by the insertion of a test sample in the test chamber.

12. A nephelometer according to claim 1, wherein the source of light is electrically powered and the electrical circuitry includes means for limiting below normal the amount of power supplied to the source of light, ane means for switching to normal power.

* * * * *